Aug. 4, 1959
D. F. SHELDON
2,898,486
SPEED RESPONSIVE GENERATORS
Filed Aug. 27, 1954
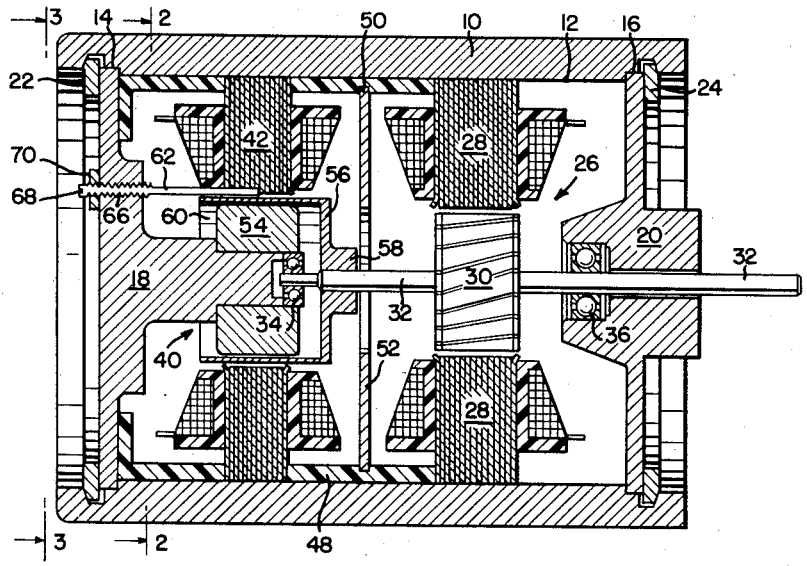
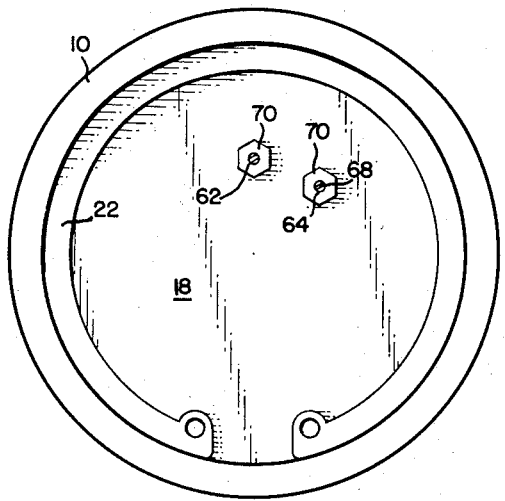
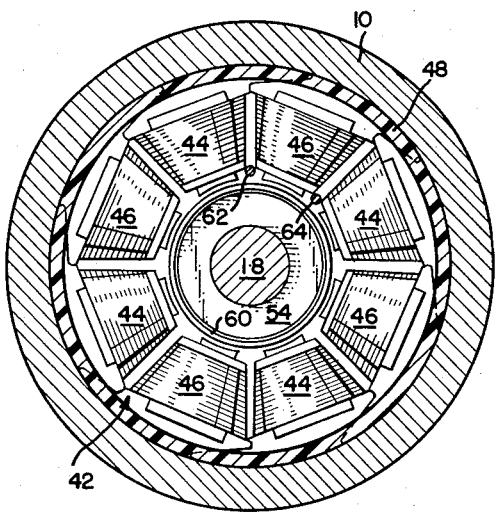
INVENTOR
DONALD F. SHELDON
BY *George H Fisher*
ATTORNEY

United States Patent Office 2,898,486
Patented Aug. 4, 1959

2,898,486

SPEED RESPONSIVE GENERATORS

Donald F. Sheldon, Minneapolis, Minn., assignor to Minneapolis-Honeywell Regulator Company, Minneapolis, Minn., a corporation of Delaware Application August 27, 1954, Serial No. 452,552

1 Claim. (Cl. 310—171)

Velocity signal generators are in widespread use in the control art and have many applications among which is the development of a control signal proportional in magnitude to the speed at which the driven member of the generator is rotated. Generally the velocity signal generators have linear characteristics, i.e., the voltage output from the generator is directly proportional to the speed of the rotating part. Theoretically, when the speed of the driven part is zero there will be no voltage output from the generator. However, due to several factors among which is magnetic circuit asymmetry, there results in finite voltage being produced in the generator output windings even when the rotor shaft is at a standstill. Various expedients have been proposed in the past to eliminate this residual voltage or zero speed voltage but none of them are completely satisfactory.

This invention pertains to an improved means of reducing residual or zero speed voltage from velocity signal generators.

An object of this invention is to provide an improved velocity signal generator.

A more specific object of the invention is to eliminate residual or zero speed voltage signals from a velocity signal generator by providing a magnetic member between the rotor member and the stator member of the generator, the magnetic member being adjustable with respect to the stator and the rotor so as to provide a means of varying the coupling between the primary and secondary windings of the stator as will be described with greater particularity in the specification below.

Other and more specific objects of the invention, including constructional details will be set forth more fully in and become apparent from a reading of the following specification and appended claim, in conjunction with the accompanying drawing in which:

Figure 1 is a longitudinal cross-sectional view of a device comprising in part a velocity signal generator incorporating my invention;

Figure 2 is a transverse cross-sectional view of the apparatus shown in Figure 1 as seen along section lines 2—2 of Figure 1; and Figure 3 is an end view of the apparatus shown in Figure 1 as viewed along section lines 3—3.

The improved apparatus comprises a cylindrical housing member 10 having a generally cylindrical bore 12 therein. The ends of housing 10 are relieved as at 14 and 16 so as to receive end members 18 and 20 respectively, said end members being resiliently held in place with respect to the housing 10 by snap rings 22 and 24. A stator member 28 of a driving motor 26 is securely positioned within the bore 12 of housing 10 and well may be of the type shown in the Gille Patent 2,145,791 wherein a plurality of salient poles are provided and are adapted to be energized by a suitable split or polyphase voltage so as to develop a rotating flux. The inwardly extending poles of stator member 28 define a circular opening in which is concentrically positioned a rotor element 30 which well may be of conventional squirrel cage construction and which is mounted on a rotor shaft 32. Suitable bearings 34 and 36 respectively disposed in end members 18 and 20 support shaft 32 for rotation. One end of shaft 32 extends out through a suitable aperture in end member 20 so as to provide a means of coupling the rotative output of motor 26 to other control apparatus as desired.

A stator member 42 of a velocity signal generator generally indicated by reference numeral 40 is also adapted to be securely positioned within cylindrical bore 12 of housing member 10. As seen in Figure 2, stator 42 is of a salient pole construction, having eight inwardly extending poles which terminate so as to define a circular opening. Stator 42 in general may also be constructed in accordance to the teaching of the Gille Patent 2,145,791. Alternate poles on stator 42 have primary coil means 44 thereon adapted to be energized by a suitable alternating current voltage. The remaining poles have secondary coil means 46 positioned thereon which serve as sensing or pickup coils and are adapted to be connected to control apparatus, not shown, by connection means, also not shown, so as to utilize the signal developed therein. A tube-like bushing member 48 of insulating material is disposed between stators 28 and 42 so as to maintain them in spaced relationship. An annular notch or groove 50 is provided on the inner periphery of bushing 48 and serves to position a magnetic shield 52 which is placed between stators 28 and 42 for the purpose of shunting out any stray leakage flux existing in this area and which otherwise might generate erroneous signals in the sensing coils 46 of the velocity signal generator 40.

A symmetrical magnetic inner pole 54 is affixed to an inwardly extending central portion of end member 18 and is positioned concentrically with respect to the pole faces of the poles on stator member 42 so as to define an annular air gap therebetween. A cup or drum type rotor 56 having a hub portion 58 secured by suitable means, not shown, to rotor shaft 32 of motor 26 is positioned so that its rim portion 60 is concentrically disposed in the annular air gap defined by the stator 42 and innerpole 54 of velocity signal generator 40. Rotor 56 is preferably constructed out of a highly conductive material such as copper or aluminum or the like so that, as is well understood by those skilled in the art, when rotated it will cause magnetic fluxes to link the sensing coils 46 on stator member 42 so as to develop a voltage therein proportional to the speed of rotation of rotor member 56.

When rotor shaft 32 is at a standstill, there theoretically should be no net flux linkages in the sensing coils 46. However, as indicated above, due to asymmetrical characteristics of the magnetic circuit as well as to other irregularities, the desired zero-zero speed signal is not achieved. To alleviate this, I have provided a pair of pin members 62 and 64 of magnetic material which are adapted to be axially disposed and threaded through suitable threaded apertures 66 in end member 18. The inwardly extending ends of the magnetic adjusting pins 62 and 64 are adapted to lie between adjacent pole tips as well as being between the rim portion of rotor 56 and stator 42. The outwardly extending portion of magnetic adjusting pins 62 and 64 have tool receiving recesses 68 therein so that the pins may be rotated with respect to end member 18, said rotation causing an axial displacement of the pins with respect to the stator and rotor of the velocity signal generator. Jam nuts 70 are provided so as to lock adjusting pins 62 and 64 with respect to end member 18 once the optimum position has been ascertained. After the velocity signal generator motor unit has been assembled, the primary windings 44 of the stator 42 of the velocity signal generator should be energized and the signal output from the sensing coils 46 should be noted while the rotor 56 is at a standstill.

Should a residual or zero speed voltage be present, then the adjusting pins 62 and 64 may be axially displaced back and forth until the residual or zero speed voltage has been nulled out. Two adjusting pins 62 and 64 are provided so as to positively assure reduction of the residual voltage. To explain this further, at the time of construction of the velocity signal generator it is not known just what the asymmetrical characteristics of the device are or how they will affect the residual voltage. Should only one adjusting pin be provided, it might be found that inserting the pin inwardly with respect to the stator 42 would have the effect of making the residual signal larger instead of smaller and that even when fully withdrawn from the stator, a residual signal would still be present. Therefore, a second pin is provided and as will be understood by those skilled in the art, by being between the next adjacent pair of pole faces, insertion of this second pin will produce the opposite effect from insertion of the first mentioned pin so that if the first mentioned pin was ineffective to reduce the residual voltage then the second one will be effective to reduce said residual voltage.

While I have shown and described a specific embodiment of this invention, further modifications and improvements will occur to those skilled in the art. I desire it to be understood therefore that this invention is not limited to the particular form shown and I intend in the appended claim to cover all modifications which do not depart from the spirit and scope of this invention.

What I claim is:

A velocity signal generator of the class described comprising: a housing; a stator member positioned within said housing and having an even number of inwardly extending, circumferentially spaced poles; primary winding means, adapted to be energized by alternating current, positioned on alternate ones of said poles, secondary winding means positioned on the others of said poles; a magnetic innerpole concentrically positioned with respect to said stator member, said poles having pole faces which, together with said innerpole, define an annular air gap; a cup type rotor member of conductive material; means mounting said rotor member for rotation in the air gap, so that the magnetic coupling between said primary and secondary winding means varies according to the rotational velocity of said rotor member; a member of magnetic material having a portion extending axially adjacent said air gap and between a pair of said poles, and means mounting said member of magnetic material for continuous axial adjustment relative to said pair of poles, so as to vary the coupling between said winding means and thereby provide means for adjusting the output of said secondary winding means to zero when said rotor member has zero rotational velocity.

References Cited in the file of this patent

UNITED STATES PATENTS

| 2,206,920 | Riggs | July 9, 1940 |
| 2,477,424 | Schweitzer | July 26, 1949 |
| 2,671,179 | Blanchard | Mar. 2, 1954 |
| 2,671,180 | Goldberg | Mar. 2, 1954 |
| 2,694,797 | Lindblad | Nov. 16, 1954 |

FOREIGN PATENTS

| 852,512 | Germany | Oct. 16, 1952 |